United States Patent
Deval et al.

(10) Patent No.: US 7,388,840 B2
(45) Date of Patent: *Jun. 17, 2008

(54) METHODS AND APPARATUSES FOR ROUTE MANAGEMENT ON A NETWORKING CONTROL PLANE

(75) Inventors: Manasi Deval, Beaverton, OR (US); Hsin-Yuo Liu, Beaverton, OR (US); Pugi Tang, Portland, OR (US); Rajeev Muralidhar, Santa Clara, OR (US)

(73) Assignee: Intel Corporation, Santa Clara, CA (US)

( * ) Notice: Subject to any disclaimer, the term of this patent is extended or adjusted under 35 U.S.C. 154(b) by 949 days.

This patent is subject to a terminal disclaimer.

(21) Appl. No.: 10/610,858

(22) Filed: Jun. 30, 2003

(65) Prior Publication Data
US 2004/0264384 A1 Dec. 30, 2004

(51) Int. Cl.
*G01R 31/08* (2006.01)
(52) U.S. Cl. ...................... 370/237; 370/238
(58) Field of Classification Search ............ None
See application file for complete search history.

(56) References Cited

U.S. PATENT DOCUMENTS

| | | | | |
|---|---|---|---|---|
| 5,966,378 A * | 10/1999 | Hamalainen | ............. | 370/348 |
| 6,678,264 B1 * | 1/2004 | Gibson | .............. | 370/352 |
| 6,785,277 B1 * | 8/2004 | Sundling et al. | ........... | 370/392 |
| 6,970,943 B1 * | 11/2005 | Subramanian et al. | ...... | 709/238 |
| 7,209,449 B2 * | 4/2007 | Tang et al. | ............ | 370/238 |
| 2004/0105388 A1 * | 6/2004 | Wilkins et al. | ............ | 370/235 |

* cited by examiner

*Primary Examiner*—Robert W Wilson
(74) *Attorney, Agent, or Firm*—Schwabe, Williamson & Wyatt, P.C.

(57) ABSTRACT

An open networking routing system includes at least one forwarding element, and a control element communicatively coupled to the forwarding element(s). In one embodiment, the control element is equipped with a route cache manager to receive notification of a routing table update in the control element, and facilitate notification of the routing table update to at least one functional component within the control element and forwarding element(s) in a coordinated manner to maintain routing coherency between the control element and forwarding element(s).

19 Claims, 5 Drawing Sheets

METHODS AND APPARATUSES FOR ROUTE MANAGEMENT ON A NETWORKING CONTROL PLANE

BACKGROUND

1. Technical Field

Certain illustrative embodiments described herein relate to devices and processes for routing packets of information in network communications and, more specifically, to systems and methods for implementing route updates.

2. Background Information and Description of Related Art

Networks of computers such as intranets, local and wide area networks, and public networks such as the Internet typically exchange information in the form of packets/ datagrams. In addition to data, a packet typically includes header section that contains information identifying the packet and indicating its origin and destination. The header can further include network protocol identifiers, which describe the version number of the protocol that is to be used to transmit the information through and amongst networks.

Network devices that transmit data packets and their associated headers amongst networks are known as "routers." In order to be transmitted from one network to another, data packets are typically routed by one or more routers to one or more public networks, private networks and/or individual server/client computers. Routers often include a routing table that specifies the manner in which the data packets are transmitted from the input ports to the output ports of the routers based on the destinations of the packets. Routers can implement a dynamic routing process whereby each router exchanges with other routers through standard routing protocols (such as Routing Information Protocol (RIP) as e.g. defined in RFC 1058 dated June 1988 and available at "http://www.ietf.org/rfc/rfc1058.txt?number=1058" and/or Open Shortest Path First (OSPF) as e.g. defined and RFC 1583 dated March 1994 and available at http://www.ietf.org/rfc/rfc1583.txt?number=1583). The periodic route updates of such routing protocols provide information regarding how to route the packets along the paths by which the router is currently connected to other routers and networks. Upon receipt of routing update packets, such as a RIP or OSPF update, each router can process the update and record any new routing information, or network path descriptors, into its routing table.

Routers can have an open network architecture wherein the router includes a control plane that creates and manages the routing protocols, and a separate forwarding plane that forwards the packets pursuant to information specified e.g. in an associated forwarding table, sometimes called a FIB. In such architectures, the forwarding plane may include multiple forwarding elements managed by a single control element. In such cases, each forwarding element may contain both a RIB and a FIB, where a RIB typically contains the routing information that entities exchange via an inter-domain routing protocol, and the FIB typically contains the information that that the entities use to forward the inter-domain traffic.

Unfortunately, routing errors can occur if route updates are implemented at different times by the various forwarding elements controlled by the single control element. For instance, if a packet is received by a router that is processing route updates, the packet could be transmitted by an "updated" forwarding element to a "un-updated" forwarding element that drops the packet because it has not yet processed the route update. Further compounded the chance of routing errors occurring due to route update inconsistencies is the fact that the forwarding plane typically performs wire speed packet forwarding whereas the control plane operates at a somewhat slower speed.

BRIEF DESCRIPTION OF DRAWINGS

The invention may best be understood by referring to the following description and accompanying drawings that are used to illustrate embodiments of the invention. In the drawings.

DETAILED DESCRIPTION OF ILLUSTRATIVE EMBODIMENTS

A system for updating routing information can be realized in, for example, an open network system having a single control element and multiple forwarding elements. In one embodiment of the invention, the routing update is received by a route cache manager in the control element, which in turn may facilitate notification of the routing table update to one or more forwarding elements as well as to one or more functional components within the control element, in a coordinated manner to maintain routing coherency between the control element and the forwarding element(s).

In the following detailed description, numerous specific details are set forth in order to provide a thorough understanding of embodiments of the present invention. However, those skilled in the art will understand that such embodiments may be practiced without these specific details. In other instances, well known methods, procedures, components, and circuits have not been described in detail.

Although various discrete operations will be described herein, the mere order of description should not be construed as to imply that these operations are necessarily performed in the order they are presented.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments. Lastly, the terms "comprising", "including", "having", and the like, as used in the present application, are intended to be synonymous.

Figure 1:
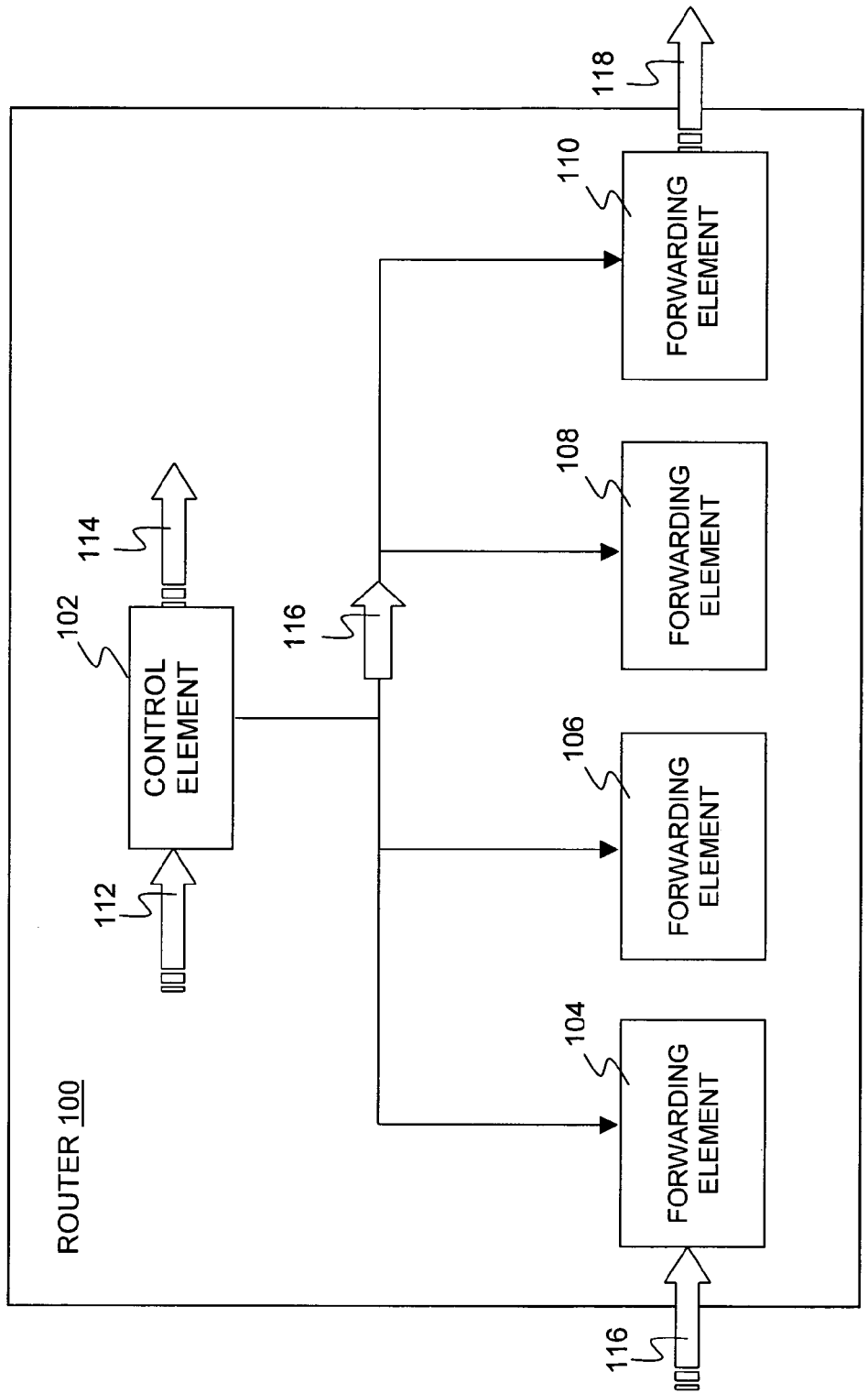
FIG. 1 illustrates one embodiment of an open architecture based networking routing element having physically separated control and forwarding planes of operation with the forwarding plane including one or more forwarding elements.

In an open networking architecture, a network element typically includes two distinct planes of operation, namely a control plane and a forwarding plane. FIG. 1 illustrates one embodiment of an open architecture based network routing element having separated control and forwarding planes of operation. As shown in FIG. 1, example router architecture 100 includes a control element 102 and forwarding elements 104-110, which are physically separated from control element 102. Control element 102 may represent a combination of hardware, such as one or more microprocessors and memory elements, and software configured to receive routing updates 112, such as RIP updates or OSPF Link State Advertisements (LSA) from peer routers (not shown). Likewise, control element 102 may also generate and transmit route updates 114 to peer routers (not shown). In one embodiment, control element 102 processes route updates 112 and forwards updated routing information, such as FIB updates, to forwarding elements 104-110 and/or one or more clients of control element 102 in a coordinated manner. A client may represent one or more components within control element 212, which may use one or more methods associated with the control element and/or which may listen to one or more events associated with the control element.

Forwarding elements 104-110 may represent a combination of hardware (such as one or more microprocessors and memory elements) and software configured to transmit and route data, typically at wire speed. Forwarding elements 104-110 may be connected to one or more external networks through one or more peer routers (not shown). Additionally, forwarding elements 104-110 may implement and enforce RIB and/or FIB based updates received from e.g. control element 102. For example, the RIB may govern the data flow 116 into the ingress forwarding element 104 and the data flow 118 from the egress forwarding element 110 on e.g. layer 3 in an OSI model. Moreover, the FIB may govern the forwarding of data packets 116 between and amongst forwarding elements 104-110 (e.g. inter-FE forwarding) on e.g. layer 2.5 (label switching layer) of the OSI model. Router 100 can be connected to other routers associated with private networks (such as intranets, VPNs, LANs, WANs and the like) and/or public networks (such as the Internet).

In one embodiment, one or more of control element 102 and forwarding elements 104-110 may include one or more network processors to execute instructions designed to implement a network forwarding device, such as a router, in accordance with various embodiments of the invention described herein. In one embodiment, one or more of control element 102 and forwarding elements 104-110 may include one or more processors from the IXP™ family of network processors, available from Intel Corporation of Santa Clara, Calif.

Figure 2:
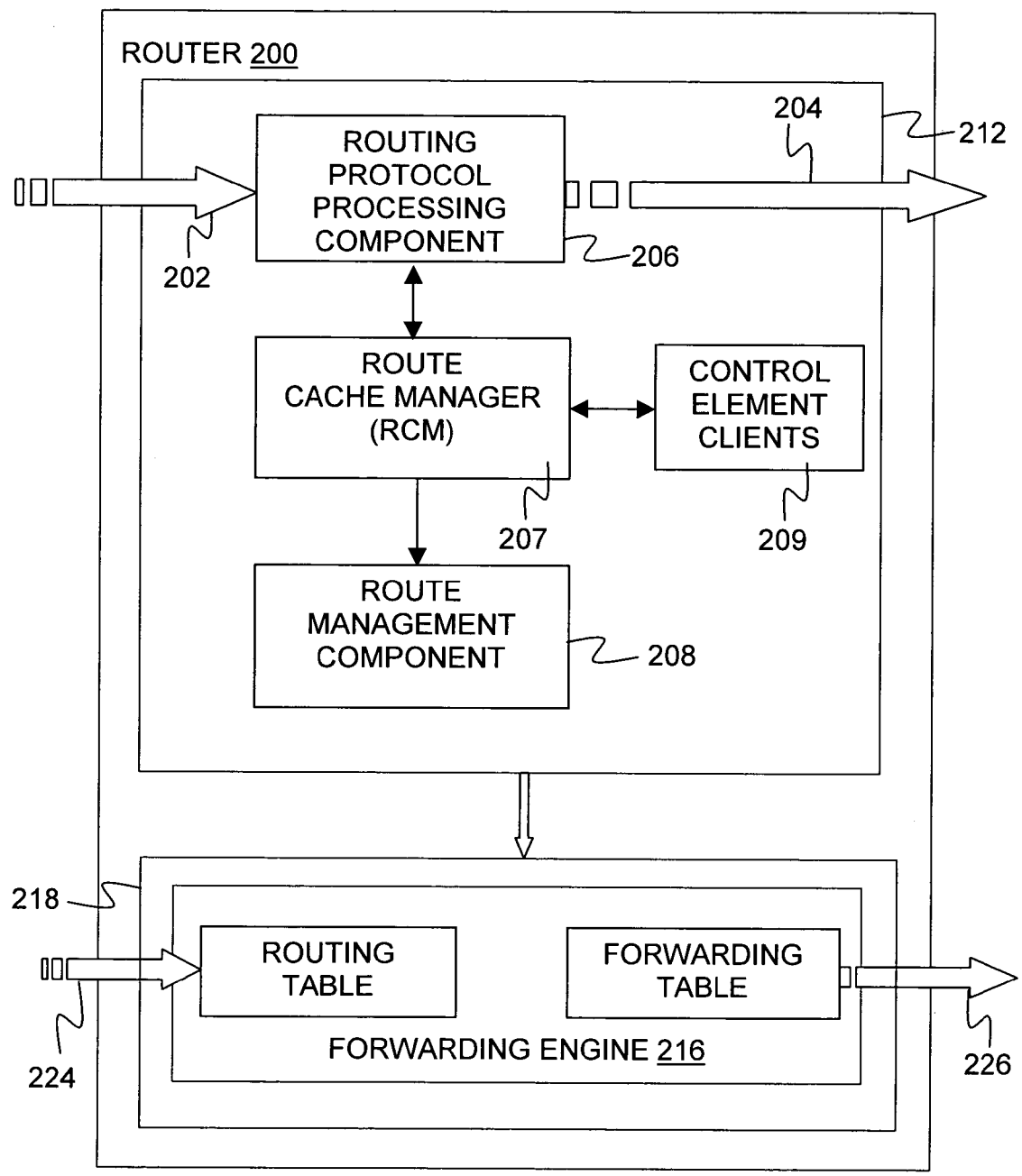
FIG. 2 illustrates a more detailed view of an open networking architecture based routing element, in accordance with one embodiment of the invention.

FIG. 2 illustrates a more detailed view of an open networking architecture based routing element, in accordance with one embodiment of the invention. In particular, router 200 includes control element 212 and forwarding element 218 communicatively coupled together. In one embodiment, control element 212 and forwarding element 218 reside on physically separated platforms, however in other embodiments, control element 212 and forwarding element 218 may nonetheless reside on a shared physical platform.

In the illustrated embodiment, control element 212 includes a routing protocol processing component 206, a route cache manager (RCM) 207, a route management component 208, and one or more control element based clients 209 such as, but not limited to, a Resource Reservation Setup Protocol Traffic Engineering (RSVP-TE) based client, a Constraint-Routing Label Distribution Protocol (CRLDP) based client and a Multi-Protocol Label Switching (MPLS) protocol based client. Forwarding element 218 includes a forwarding engine 216, which may in turn include one or more routing tables (RIB) 222 and/or forwarding tables (FIB) 220.

In operation, routing protocol processing component 206 receives a route update, such as a RIP update or an OSPF link state update to a network routing table stored in and/or maintained by e.g. a kernel of an operating system (hereinafter "kernel") that is hosted by control element 212. Routing protocol processing component 206 in turn notifies RCM 207 as to the route update information. In one embodiment of the invention, route updates may be received by the kernel via an IOCTL operation, whereas RCM 207 may receive route update information from routing protocol processing component 206 via a service interface to e.g. an IP stack. For example, in a VxWorks operating environment RCM 207 may receive route update information via the routeEnhLib library. In one embodiment RCM 207 registers with the kernel to receive route update information from the kernel FIB.

In one embodiment, RCM 207 maintains an internal cached routing table to facilitate coordinated route updating between the control and forwarding element(s), as well as one or more components/clients of control element 212 that might utilize route information. In accordance with one embodiment of the invention, in response to receiving the route update information from routing protocol processing component 206, RCM 207 coordinates notification of the route update information to route management component 208 and one or more functional components of control element 212, such as clients 209 that may have previously registered with control element 212. In one embodiment of the invention, RCM 207 transmits the route update information to route management component 208 via invocation of one or more application program interfaces (API's). In turn, route management component 208 manages the interface between control element 212 and one or more forwarding elements 218 so as to further facilitate routing coherency between the control element and forwarding element(s).

More specifically, route management component 208 may derive any RIB and/or FIB updates determined to be necessary based upon e.g. the route update information. A RIB update may be transmitted from route management component 208 to forwarding engine 216 in the form of an updated routing table, whereas a FIB update may be transmitted from route management component 208 to the forwarding engine in the form of an updated forwarding table. As data is received by router 200, the data may be transmitted to another FE pursuant to the rules set forth in the forwarding table (FIB) 220 or to an external network component pursuant to the rules set forth in the routing table (or RIB) 222.

Route Updates

In one embodiment, one or more clients 209 may register a callback with RCM 207. Accordingly, upon receiving a route update involving a route addition or deletion, RCM 207 may trigger a callback to notify such registered clients as to a given update. In one embodiment, RCM 207 marks routes to be deleted within an internal cache prior to committing the deletion of the routes from e.g. the FIB. Similarly, in one embodiment, RCM 207 only commits route additions to its internal cache after the routes have successfully been added to the forwarding plane(s).

Route Addition

Figure 3:
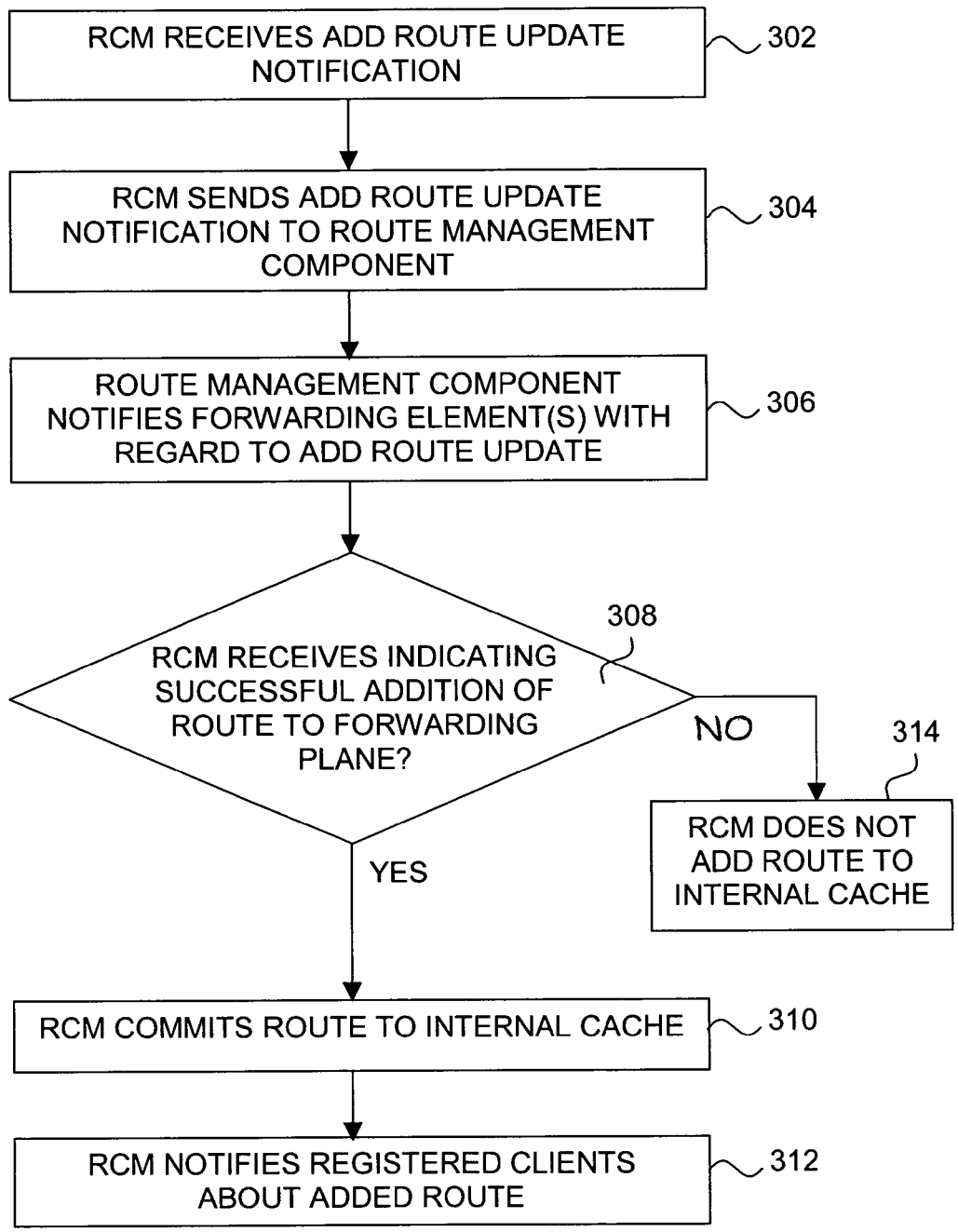
FIG. 3 is a flow diagram illustrating a process for adding a new route to the exemplary system of FIG. 2, in accordance with one embodiment of the invention.

FIG. 3 is a flow diagram illustrating a process for adding one or more new routes to the exemplary system of FIG. 2, in accordance with one embodiment of the invention. In particular, the process embodied in FIG. 3 begins with RCM 207 receiving a route update notification from routing protocol processing component 206 indicating the addition of one or more new routes to control element 212 (block 302). In one embodiment, RCM 207 is notified through a routing socket that there has been a change in the kernel FIB, and in particular, that a new route is being added to the kernel FIB. Next, the RCM sends an update notification to route management component 208 indicating the addition of the route (block 304). In one embodiment, RCM 207 notifies route management component 208 via invocation of one or more IPv4 based open networking API calls, encompassed by e.g. "IPv4 unicast forwarding service API" defined by the Network Processing Forum (NPF) (see e.g. http://www.npforum.org/pressroom/04-30-03_IPv4Release.pdf.) In turn, route management component 208 notifies the appropriate forwarding element(s) with regard to the addition of the route (block 306). For example, route management component 208 may generate an appropriate number of calls to a forwarding plane plug-in module based upon the number of forwarding elements present. The forwarding plane plug-in module may then send the "add route" messages to the forwarding elements using e.g. a communication protocol such as that defined by the IETF Forwarding and Control Element Separation (ForCES) Framework (June 2003), available at "hftp://www.ietf.org/internet-drafts/draft-ietf-forces-framework-06.txt".

At block 308 a determination is made as to whether RCM 207 has received a notification indicating that the new route was successfully added to the forwarding plane. In one embodiment, RCM 207 receives a callback from the forwarding plane via an IPv4 based control plane callback module. If RCM 207 has been notified as to the successful addition of the route into the forwarding plane, RCM commits the new route to an internal route cache (block 310), and proceeds to notify registered clients within the control element (e.g. as indicated by a client registration table) as to the presence of the newly added route (block 312). However, if RCM 207 has not been notified as to the successful addition of the route into the forwarding plane, or RCM 207 has been notified as to an unsuccessful addition of the route into the forwarding plane, RCM 207 will not add the new route to its internal cache (block 314). By waiting to notify clients about the route addition until after a route has been successfully added to the forwarding element(s), the chance of packets being misrouted or the client being mislead into relying on an incorrect or otherwise invalid path can be reduced.

Route Deletion

Figure 4:
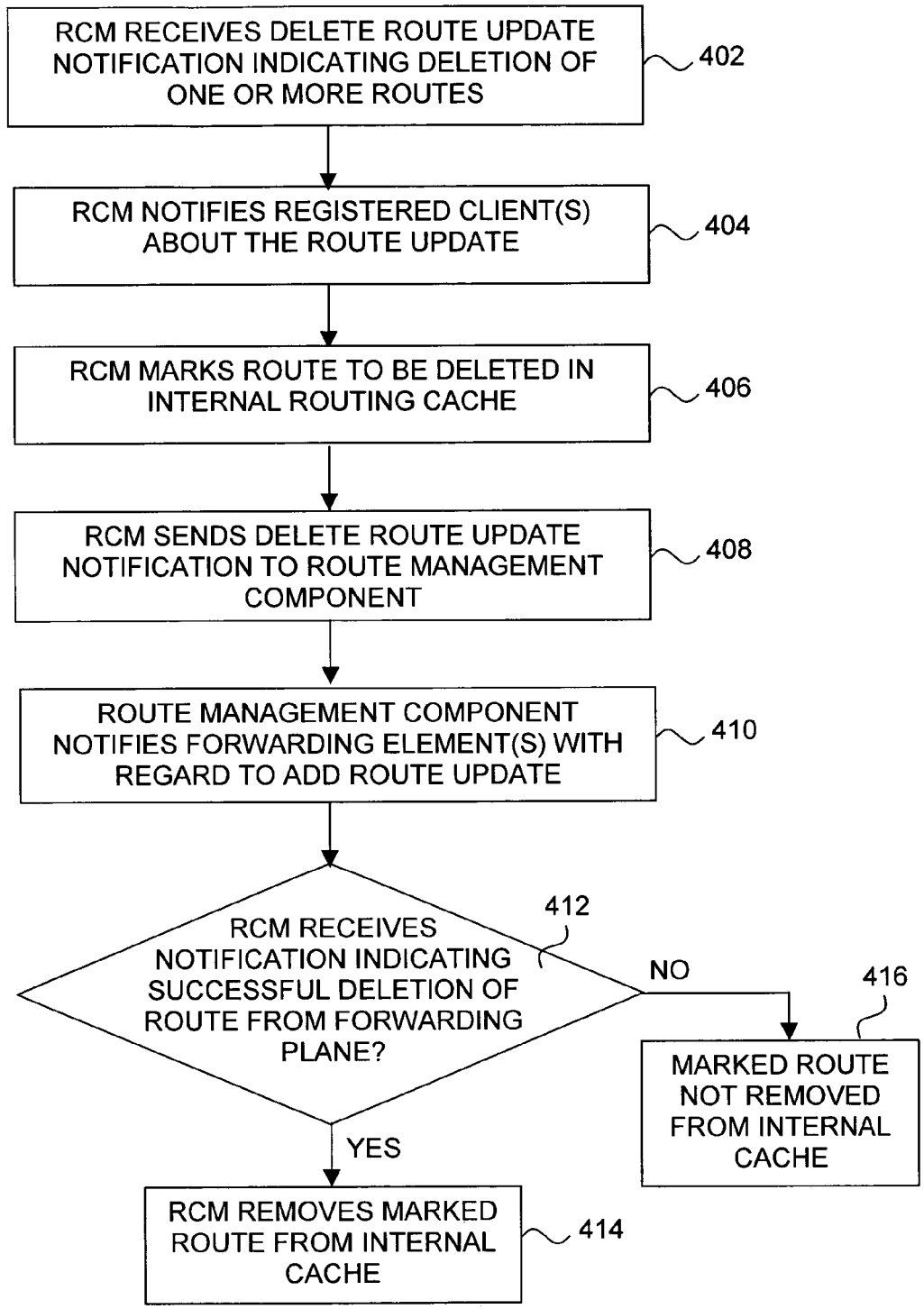
FIG. 4 is a flow diagram illustrating a process for deleting a route from the exemplary system of FIG. 2, in accordance with one embodiment of the invention.

FIG. 4 is a flow diagram illustrating a process for deleting a route from the exemplary system of FIG. 2, in accordance with one embodiment of the invention. The process embodied in FIG. 4 begins with RCM 207 receiving a route update notification indicating the deletion of a route from control element 212, such as from the kernel FIB (block 402). Once RCM 207 is notified as to the route deletion, RCM 207 proceeds to notify registered clients as to the route deletion (block 404). Once the registered control element clients have been notified with regard to the deletion of the route, RCM 207 marks the route as 'to be deleted' in e.g. an internal routing cache (block 406). Next, RCM 207 sends an update notification to route management component 208 indicating the deletion of the route (block 408). In turn, route management component 208 notifies the appropriate forwarding element(s) with regard to the deletion of the route (block 410).

At block 412, a determination is made as to whether the route deletion from the forwarding plane was successful. If the route deletion from the forwarding plane was successful as indicated e.g. by a notification received by RCM 207, RCM proceeds to remove the route marked for deletion from its internal cache (e.g. RCM 207 commits the deletion) (block 414). However, if the route deletion from the forwarding plane was not successful, the route marked for deletion is not removed from the internal cache, (block 416). Accordingly, it is possible to reduce route misuse by the clients by letting the RCM inform the client upfront about the route to be deleted from the forwarding plane.

Additional Route Update Functions

Figure 5:
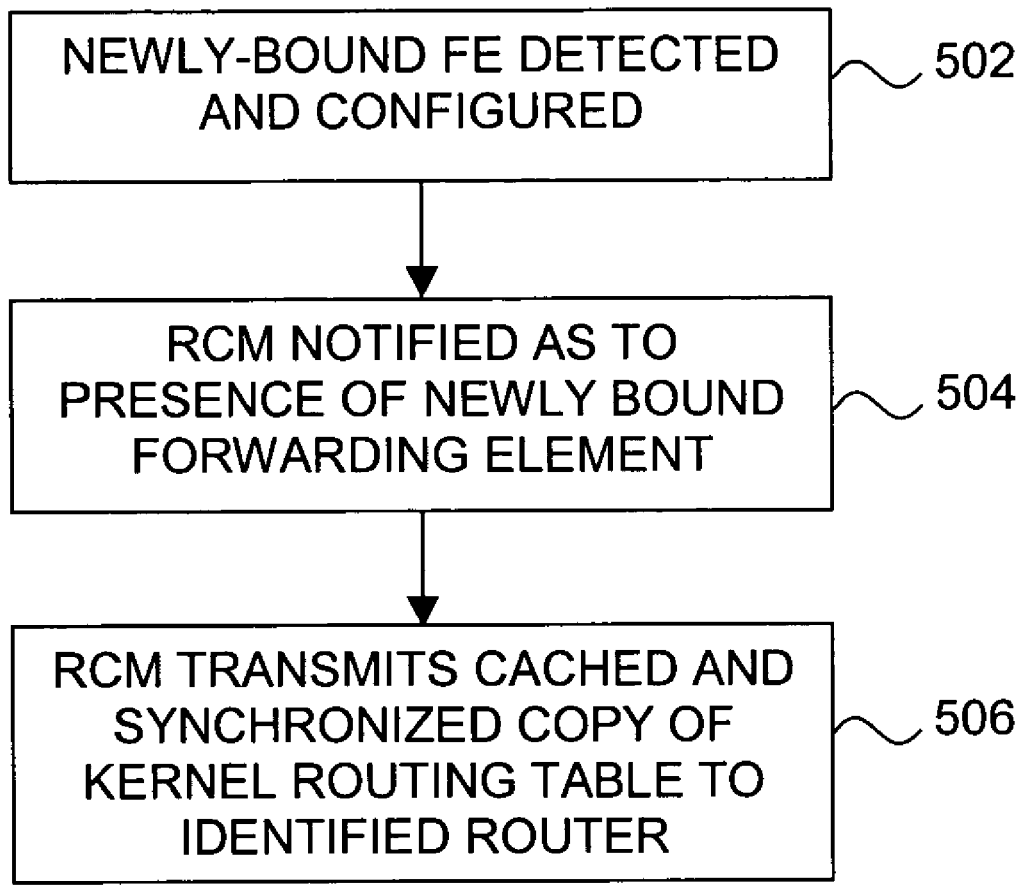
FIG. 5 is a flow diagram illustrating a process for updating a newly bound forwarding element with route information, in accordance with one embodiment of the invention.

Due to the extensible nature of open networking architectures, new forwarding elements may be dynamically bound to control elements. FIG. 5 is a flow diagram illustrating a process for updating a newly bound forwarding element with route information, in accordance with one embodiment of the invention. In the illustrated embodiment, the process starts with a newly added forwarding element being detected and configured for operation with (e.g. bound to) control element 212 (block 502). This may involve the control element downloading configuration information such as IP addresses, attributes, filters, and so forth, to the newly bound forwarding element. Thereafter, RCM 207 is notified as to the existence of the newly bound forwarding element (block 504). In turn, RCM 207 downloads a current cached and synchronized copy of the kernel routing table to route management component 208 (block 506). In one embodiment of the invention, RCM 207 does not download to the FE(s), routes that are indicated as to be deleted (e.g. in the RCM internal route cache) prior to the actual route deletion being committed. Similarly, in one embodiment, routes marked for addition are downloaded to the FE(s) prior to the route addition being committed.

In one embodiment of the invention, RCM 207 invokes one or more API calls to cause route cache manager 208 to commit the copy of the kernel routing table to the correct forwarding element and perform inter-FE configuration if multiple forwarding elements are presented.

In one embodiment of the invention, various applications/clients such as a Label Information Base (LIB) or an RSVP-TE based client perform route lookups (e.g. next hop lookups for a particular destination IP address) via RCM 207. In one embodiment, a client application may pass a destination IP address and a subnet mask to RCM 207 to perform such a route lookup. In response, RCM 207 searches for the requested route from the internal route cache. However, while doing so, RCM 207 ignores those routes that are marked as new (e.g. recently added) since their addition is not yet completed, and those routes that are marked to be deleted since they will in fact soon be deleted. Finally, RCM 207 returns any identified next-hop information to the requesting application.

In one embodiment, RCM 207 can further notify client applications when the next hop entry for a particular destination IP address changes. For example, a client application may register a callback with RCM 207, which in turn may cause RCM 207 to update a client registration table accordingly. Thereafter, if the route changes at any point, RCM 207 is notified. In one embodiment, since a change to a route entry may include a next hop change, a subnet mask change, a change in metric, and so forth, RCM 207 performs a check to determine whether the change is a change to the next-hop entry. If the detected change is determined to be to the next hop, the internal cache is updated and the appropriate client applications are contacted.

Epilogue

The foregoing techniques and systems can be implemented in a wide variety of network architectures to effectively update routing information according to an almost limitless number of specific transactional protocols. For example, the routers described herein need not have an Open Networking architecture. Moreover, although the routers have been described has having physically separated control and forwarding planes, the routers can nevertheless have control and forwarding planes residing on the same physical platform. The techniques described herein can be applied across multiple routers that each have only a single forwarding element but collectively have a plurality of forwarding elements. The route update information can be any parameter or datum associated with the handling of a packet, although in various embodiments the update information may include RIP updates, and/or OSPF link status updates. Each control element can optionally control only a single forwarding element. Alternately, multiple control elements can be connected to a single forwarding element. The forwarding elements need not transfer packets directly from the ingress to the egress port. For example, in certain implementations it may be necessary or desirable to transmit or contingently transmit packets through one or more intermediate forwarding elements.

The components and planar separation of the forwarding and control elements discussed above are merely preferred arrangements—the various components and/or their functions can be relocated to other planes or elements or can be combined with one another. As an example, the routing protocol processing module, route cache manager and/or route management component can be integrated into a single program element/component if desired. Similarly, aspects of the forwarding management module and forwarding engine can be combined if desired. For example, although the forwarding table and routing table are described as being maintained as discrete elements in the forwarding engine in the aforementioned embodiments, the RIB and FIB can nonetheless be integrated into a single table.

Similarly, it will be apparent to those skilled in the art that the specific protocols described above, and their particular sequencing, are merely illustrative embodiments selected for the particular network architecture and control/forwarding elements illustrated in FIG. 2. Moreover, although reference is made herein to version 4 of the Internet Protocol (IPv4), techniques described herein similar apply to succeeding versions of the Internet Protocol such as e.g. IPv6.

While the above description has been directed primarily to routers, the above techniques can be used to implement updates in any number of network applications, such as administrative updates to client computers in an intranet, LAN, WAN or VPN.

The foregoing techniques can be implemented in an almost limitless number of additional manners dictated by particular network environment(s), transfer protocols, and other design parameters. The foregoing proposed modifications will be understood as merely illustrative by those skilled in the art. It will be understood that various modifications may be made without departing from the spirit and scope of the invention. Accordingly, other embodiments are within the scope of the following claims.

The systems and methods described herein may have only a certain subset of the functionalities described, depending on the particular implementation. In selected embodiments, the foregoing systems and methods improve route coherency via consistent route updating between the forwarding plane and control plane as well as control plan client applications. This in turn reduces the likelihood and/or frequency of dropped or mis-routed packets. Furthermore, many embodiments provide the aforementioned fail-safe arrangement whereby a route update is aborted if any component involved in implementing the routing and forwarding updates is unable to commit the update in the manner or at the time desired. A router equipped with the above-described components can therefore be optionally configured to "rollback" to a previous routing state in the event any error occurs during an update process.

What is claimed is:

1. A routing system, comprising:
   at least one forwarding element; and
   a control element communicatively coupled to said at least one forwarding element, the control element including a route cache manager to:
   receive a route update notification in the control element, and
   notify, based on said reception of the route update notification, at least one functional component within the control element and said at least one forwarding element as to the route update notification in a coordinated manner to maintain routing coherency between the control element and said at least one forwarding element to reduce frequency of data packets received by the system being dropped or misrouted, said notify including notifying one of said at least one functional component or said at least one forwarding element as to the route update notification if notifying the other of said at least one functional component or said at least one fowarding element as to the route update notification is successful.

2. The routing system of claim 1, wherein said route cache manager to, if said route update notification indicates addition of one or more new routes, notify said at least one forwarding element as to the route update notification and to determine whether said at least one forwarding element has been successfully notify as to the update notification before notifying said at least one functional component as to the route update notification.

3. The routing system of claim 2, wherein said route cache manager to, if said route update notification indicates deletion, notify said at least one functional component as to the route update notification prior to notifying said at least one forwarding element as to the route update notification.

4. The routing system of claim 1, wherein the control element and said at least one forwarding element are part of an open network router.

5. The routing system of claim 1, wherein the control element and the forwarding element reside on a shared physical platform.

6. The routing system of claim 1, wherein the control element and the forwarding element reside on separate physical platforms.

7. The routing system of claim 1, wherein the route cache manager causes, based on said reception of the route update notification, an update routing table to be provided to a forwarding engine based within said at least one forwarding element.

8. The routing system of claim 1, wherein said at least one functional component comprises at least one of a Resource Reservation Setup Protocol Traffic Engineering (RSVP-TE) client and a Constraint-Routing Label Distribution Protocol (CR-LDP) client.

9. A method, comprising:
receiving by one or more processors of a routing system having at least one forwarding plane and a control element communicatively coupled to the at least one forwarding plane a route update notification in the control element, the control element being implemented by the one or more processors; and
notifying by the one or more processors, based on said reception of the route update notification, at least one functional component with in the control element and at least one forwarding element within the at least one forwarding plane as to the route update notification in a coordinated manner to maintain routing coherency between the control element and said at least one forwarding element to reduce frequency of data packets received by the system being dropped or misrouted, said notify including notifying one of said at least one functional component or said at least one forwarding element as to the route update notification if notifying the other of said at least one functional component or said at least one forwarding element as to the route update notification is successful.

10. The method of claim 9, further comprising if said route update notification indicates addition of one or more new routes notifying said at least one forwarding element as to the route update notification and to determine whether said at least one forwarding element has been successfully notified as to the route update notification before notifying said at least one functional component as to the route update notification.

11. The method of claim 10, wherein said notifying comprises:
facilitating provision by the one or more processors of the one or more new routes to said at least one forwarding element;
receiving by the one or more processors a message indicating successful addition of the new route into said forwarding plane;
storing by the one or more processors the new route in an internal route cache within the control element; and
notifying by the one or more processors at least one client about the new route.

12. The method of claim 11, wherein the one or more new routes is or are stored by the one or more processors in the internal route cache only after the message is received from said at least one forwarding element.

13. The method of claim 11, wherein said at least one client is notified by the one or more processors about the new route after receiving the message indicating successful addition of the one or more new routes into the forwarding plane.

14. The method of claim 11, wherein facilitating provision by the one or more processors of the one or more new routes to said at least one forwarding element comprises invoking by the one or more processors one or more application programming interface calls to cause the new route to be added to said at least one forwarding element.

15. The method of claim 9, wherein the route update notification indicates a deletion of a route from a routing table within the control element.

16. The method of claim 15, wherein said notifying by the one or more processors of the route update notification comprises:
notifying by the one or more processors at least one client about the deletion of the route from the control element;
marking by the one or more processors in an internal route cache maintained by the control element, the deletion of the route from the control element;
facilitating deletion by the one or more processors of the route from the forwarding plane;
receiving by the one or more processors a message that indicates successful deletion of the route from the forwarding plane; and
deleting by the one or more processors the route from the internal route cache after receiving the message.

17. The method of claim 16, wherein the internal route cache is maintained within the control element by the one or more processors.

18. The method of claim 16, wherein said facilitating deletion by the one or more processors of the route comprises invoking by the one or more processors one or more application programming interface calls to cause the route to be deleted.

19. The method of claim 9, wherein the routing table update is indicative of at least one new forwarding element being added to the forwarding plane, and the method further comprising:
identifying by the one or more processors said at least one new forwarding element; and
invoking by the one or more processors one or more application programming interface calls to cause a routing table cache maintained by the control element to be transmitted to said at least one new forwarding element.

* * * * *

UNITED STATES PATENT AND TRADEMARK OFFICE
CERTIFICATE OF CORRECTION

PATENT NO. : 7,388,840 B2  Page 1 of 1
APPLICATION NO. : 10/610858
DATED : June 17, 2008
INVENTOR(S) : Deval et al.

It is certified that error appears in the above-identified patent and that said Letters Patent is hereby corrected as shown below:

On title page Item (75)

Line 3 of Inventors, "Pugi Tang" should be --Puqi Tang--.

Column 8:

Line 49, "... notify as to the update ..." should read --... notified as to the route update ...--.

Lines 53-54, "... indicates deletion, ..." should read --... indicates a route deletion, ...--.

Column 9

Line 18, "... with in the control ..." should read --... within the control ...--.

Signed and Sealed this

Twenty-second Day of December, 2009

David J. Kappos
*Director of the United States Patent and Trademark Office*